O. SMILEY.
PNEUMATIC CORD TIRE.
APPLICATION FILED JUNE 7, 1917.

1,294,350.

Patented Feb. 11, 1919.

WITNESSES:
Matilda Mettler
Sophia Heine

INVENTOR
Orvall Smiley
BY
A. G. Burns
ATTORNEY

UNITED STATES PATENT OFFICE.

ORVALL SMILEY, OF INDIANAPOLIS, INDIANA.

PNEUMATIC CORD TIRE.

1,294,350.    Specification of Letters Patent.    Patented Feb. 11, 1919.

Application filed June 7, 1917. Serial No. 173,425.

*To all whom it may concern:*

Be it known that I, ORVALL SMILEY, a citizen of the United States of America, and resident of Indianapolis, in the county of Marion and State of Indiana, have invented certain new and useful Improvements in Pneumatic Cord Tires, of which the following is a specification.

This invention relates to improvements in shoes for pneumatic tires and the object thereof is to provide an outer covering for partially worn pneumatic tires, so constructed as to insure its retention in place when applied.

Figure 1:
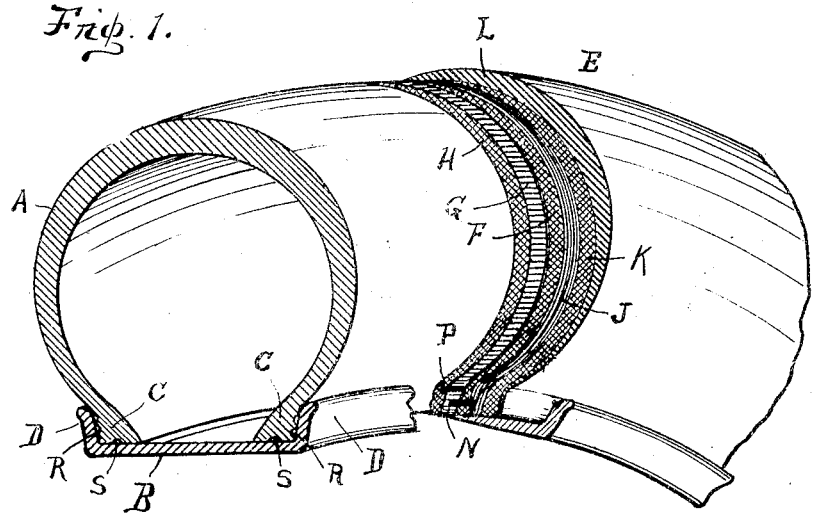
Figure 2:
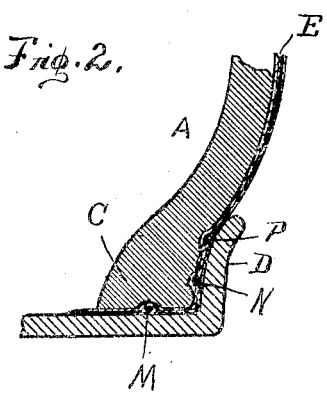

The object of the invention is accomplished by the construction illustrated in the accompanying drawings, in which:

Figure 1 is a perspective view showing part of an ordinary tire casing mounted upon the usual demountable rim, and with the invention applied, the various parts being shown in section or broken away; and Fig. 2 is a detail view upon an enlarged scale showing the manner in which the inner margin of the shoe is held between the side of the casing and the rim.

Similar characters of reference indicate corresponding parts in both views and having reference now to the same:

A is a tire-casing of the usual construction, and B is a rim in which the casing is held with its inner edges C bearing against the adjacent flanges D thereof. The invention is comprised of an outer shoe or covering E made to conform with the exterior of the casing A when the latter has been reduced by wear, the shoe being formed with strata of various materials and arranged in various fashions.

The shoe is composed of an inner lining of canvas F upon which is formed a stratum composed of cords G that extend circumferentially and in parallel relation with each other. These cords are held in place by a composition or substance such as rubber, and also by a covering H of fabric. A series of laterally extending cords J overlies the canvas stratum H which cords are covered by a canvas layer K, and upon the latter is formed a coating L of rubber that forms the wearing surface of the shoe.

A feature of the invention is the provision of a series of heavy cords M, N and P that extend circumferentially and are held embedded between the various strata near the margin of the shoe. These cords are much larger than those composing the stratum G, their size being sufficient to form ridges on the walls of the shoe. It is the intention to place these cords between the different layers of material that form the shoe. For instance: The cord P lies in the stratum G between the canvas layers F and H; the cord N lies between the canvas layer H and the stratum J; and the cord M lies between the stratum J and the canvas layer K. However, the relative arrangement of the cords between the several strata may be altered as may seem desirable, also the cords may be more or less numerous, the purpose being to form circumferential ridges in the thin margins of the shoe.

In the formation of the shoe the strata are united by the use of rubber vulcanized in a manner similar to that in which tire casings are made, and when the shoe is completed and ready for use it is intended to be mounted upon a partially worn tire casing with its margins held between the casing and the demountable rim.

The intention is also to prepare the partially worn casing A by buffing its exterior surface so as to remove roughness and fragments that cling to the surface of the casing. Also the exterior surfaces of the edges C of the casing are buffed, and if so desired grooves R and S may be formed therein in any suitable manner, such as by a buffing operation. The casing thus prepared is then inserted into the shoe. This is accomplished by distorting the casing and placing it within the shoe, and then by allowing the casing to regain its normal contour. It is desirable to coat the interior of the shoe with a rubber cement before the casing is inserted therein so the shoe and casing thereafter become united.

This coating of cement may be applied at the time the shoe is made in which event a temporary covering of fabric is applied and which may be peeled off and discarded before the insertion of the tire casing into the shoe. Thus the soft rubber coating is kept fresh and is shielded from dust and foreign matter.

The ridges caused by the large cords M, N and P extend into the grooves S and R so that the inner edges of the shoe are prevented from being drawn outwardly between the casing and the adjacent flanges of the rim. The grooves in the casing will form to some extent because of the pressure between the casing and the rim and its flanges and serve the purpose intended even though they are not previously prepared by buffing as previously mentioned. The intention is to cause the edges of the shoe to be securely held in place, and the ridges or welts occasioned by the large cords serve to prevent the edges of the shoe from pulling outwardly.

What I claim is:

In a device of the class described, a shoe shaped to fit over a tire casing and having thin margins of sufficient breadth as to extend beneath the edges of the casing, each margin having circumferential ridges upon its interior face suitably distant from its edge.

In testimony whereof I affix my signature, in presence of two witnesses.

ORVALL SMILEY.

Witnesses:
C. L. RITTER,
D. A. ANDERSON.